United States Patent [19]

Soldanski et al.

[11] Patent Number: 5,431,840
[45] Date of Patent: Jul. 11, 1995

[54] PROCESS FOR THE PRODUCTION OF CLEANING AND CARE PREPARATIONS CONTAINING APG EMULSIFIER

[75] Inventors: Heinz-Dieter Soldanski, Essen; Bernd-Dieter Holdt; Juergen Noglich, both of Duesseldorf, all of Germany

[73] Assignee: Henkel Kommanditgesellschaft auf Aktien, Duesseldorf, Germany

[21] Appl. No.: 78,236

[22] PCT Filed: Dec. 5, 1991

[86] PCT No.: PCT/EP91/02322
§ 371 Date: Jun. 21, 1993
§ 102(e) Date: Jun. 21, 1993

[87] PCT Pub. No.: WO92/11330
PCT Pub. Date: Jul. 9, 1992

[30] Foreign Application Priority Data

Dec. 21, 1990 [DE] Germany .................. 40 41 118.4

[51] Int. Cl.⁶ .................. C11D 3/22; C09G 1/04
[52] U.S. Cl. .................. 252/174.17; 106/5; 252/8.57; 252/173; 252/174.21; 252/548; 252/550
[58] Field of Search .................. 252/174.17, 174.18, 252/8.57; 106/5

[56] References Cited

U.S. PATENT DOCUMENTS

| | | | |
|---|---|---|---|
| 3,219,656 | 11/1965 | Boettner | 252/174.17 |
| 4,497,919 | 2/1985 | Varga et al. | 252/8.57 |
| 4,554,083 | 11/1985 | Soldanski et al. | 252/8.57 |
| 4,657,999 | 4/1987 | Hoefer et al. | 526/200 |
| 4,793,850 | 12/1988 | Koester et al. | 71/79 |
| 4,932,994 | 6/1990 | Koester et al. | 71/79 |
| 5,133,897 | 7/1992 | Balzer | 252/312 |
| 5,145,603 | 9/1992 | Poasch et al. | 252/311 |
| 5,268,126 | 12/1993 | Balzer | 252/312 |

FOREIGN PATENT DOCUMENTS 0182282 5/1986 European Pat. Off. .
0224778 6/1987 European Pat. Off. .
0362671 4/1990 European Pat. Off. .

*Primary Examiner*—Christine Skane
*Assistant Examiner*—A. Hertzog
*Attorney, Agent, or Firm*—Wayne C. Jaeschke; John E. Drach; Henry E. Millson, Jr.

[57] ABSTRACT

In the new process, cleaning and care preparations for floors, shoes, leather and furniture are produced by mixing a wax emulsion containing alkyl glycoside as emulsifier with the other constituents of the preparation. The alkyl glycosides correspond to the following general formula $$R-O(-G)_n \qquad \text{I}$$

in which R is a long-chain $C_{8-22}$ alkyl radical, G is a glycoside-bonded residue of a monosaccharide and n has a value of 1 to 10. The wax emulsions are distinguished by particular particle fineness and extremely good compatibility with the other constituents of the preparations.

13 Claims, No Drawings

PROCESS FOR THE PRODUCTION OF CLEANING AND CARE PREPARATIONS CONTAINING APG EMULSIFIER

BACKGROUND OF THE INVENTION

1. Field of the Invention

This invention relates to emulsions of wax in water and to their use in cleaning and care preparations.

2. Statement of Related Art

For many applications, waxes are not used in bulk or in solution, but rather in the form of emulsions in water which have various advantages over the other forms, such as ease of application, rapid mixing with other aqueous phases and the absence of inflammable or toxic solvents. Since waxes are generally not self-emulsifying, suitable emulsifiers have to be added as auxiliaries for the preparation of wax emulsions. Through the lack of workable theoretical concepts, these auxiliaries—even today—are still best selected empirically from the broad range of known emulsifiers. In many cases, compounds which have an excellent emulsifying effect on certain waxes are less suitable or unsuitable for other waxes. In many cases, therefore, the choice is still confined to emulsifiers which are not without disadvantages, such as inadequate biodegradability and incompatibility with other desired formulation ingredients, or which have troublesome effects in the practical application of the preparations produced from the emulsions. Thus, both cationic and anionic and nonionic emulsifiers are used today. Among the nonionic emulsifiers, highly ethoxylated fatty alcohols and sorbitan esters containing more than 20 mol ethylene oxide (EO) per molecule are of particular significance despite their poor biodegradability.

On account of the disadvantages attending most of the known emulsifiers suitable for wax, a search is still being conducted for compounds which are more suitable for the production and use of wax emulsions.

It has now been found that wax emulsions having excellent properties for further processing to cleaning and care preparations can be obtained providing certain alkyl glycosides are used as emulsifiers in their production.

DESCRIPTION OF THE INVENTION

Accordingly, the present invention relates to a process for the production of wax-containing preparations for the cleaning and care of furniture, paint, leather, shoes or floors, in which an emulsion of wax in water containing as emulsifier an alkyl glycoside corresponding to general formula I $$R-O(-G)_n \qquad \text{I}$$

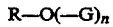

in which R is a long-chain $C_{8-22}$ alkyl radical, G is a glycoside-bonded residue of a monosaccharide and n has a value of 1 to 10, is mixed with the other constituents of the preparation.

The new process is distinguished by the fact that the wax emulsions used are particularly fine-particle emulsions and, as such, show high stability in storage. It is also worth noting that these wax emulsions can be incorporated particularly easily in the other constituents of the cleaning and care preparations. There is virtually no incompatibility with these constituents either during the production of the preparations or in their subsequent use.

The alkyl glycosides used as emulsifiers belong to a class of surfactants which have been known for more than 50 years and which were primarily proposed as wetting agents and cleaning agents in the treatment of textiles.

The alkyl glycosides may be prepared by methods known per se, cf. inter alia European patent application 362 671 where literature on earlier processes is also cited.

One synthesis of particular significance for large-scale production is essentially based on the acid-catalyzed condensation of monosaccharides of the aldose type (HO—G) with long-chain alcohols (R—OH) containing 8 to 22 and preferably 10 to 18 carbon atoms. Alkyl glycosides corresponding to formula I $$R-O(-G)_n$$

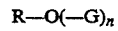

in which the value of n can be varied within wide limits through the choice of the reaction conditions, are formed with elimination of water. Alkyl glycosides corresponding to formula I with n=1 to 10 are suitable for the purposes of the invention, compounds in which n=1 to 6 and, more particularly, 1 to 2 being particularly preferred. In products where n is greater than 1, n is of course a statistical mean value.

The alkyl glycosides may also be produced from oligo- or polysaccharides which, in the course of the acid-catalyzed reaction, are then first depolymerized by hydrolysis and/or alcoholysis to lower fragments before the alkyl glycosides corresponding to formula I are formed. Mixtures of various reducing monosaccharides or polysaccharides containing various monosaccharide units may also be used as starting materials, in which case alkyl glycoside molecules of correspondingly mixed composition can be formed where n is greater than 1.

The following monosaccharides are preferred starting materials: glucose, mannose, galactose, arabinose, apiose, lyxose, gallose, altrose, idose, ribose, xylose and talose and the oligo- and polysaccharides made up of these monosaccharides, for example maltose, lactose, maltotriose, hemicellulose, starch, partial hydrolyzates of starch and sugar syrup.

However, alkyl glycosides made up of identical monosaccharide units are preferred for the purposes of the invention. Alkyl glycosides in which the residue (—G) is derived from glucose are particularly preferred. Glucose, maltose, starch and other oligomers of glycose are correspondingly used for these compounds which are also known as alkyl glycosides.

In the above-described synthesis, the alkyl moiety R is derived from long-chain, optionally unsaturated, preferably primary alcohols which may be branched, but are preferably not branched. Examples are the synthetic $C_{9-15}$ oxoalcohols and the $C_{8-22}$ fatty alcohols obtained from natural fatty acids. $C_{10-18}$ fatty alcohols and $C_{11-15}$ oxoalcohols are preferred, $C_{12-14}$ fatty alcohols being particularly preferred.

In addition to the actual alkyl glycosides corresponding to formula I, industrially produced products generally contain certain amounts of free alcohol R—OH and non-acetalized saccharides, optionally in oligomerized form. In most cases, these technical impurities do not affect the intended application. If the alkyl glycosides are produced from alcohols mixtures, for example from alcohols based on natural fats, the alkyl glycosides are of course also mixtures with a correspondingly broad meaning of R in formula I.

In the emulsions used in accordance with the invention, the alkyl glycosides are generally used in quantities of not more than 15%, based on the total weight of the emulsion. Contents of 0.5 to 10% by weight are preferred, contents of 1 to 4% by weight being particularly preferred. With high emulsifier contents, the emulsions become highly viscous, although in most cases this does not affect their usefulness.

Any known waxes of natural and synthetic origin suitable for use in cleaning and care preparations may be used as waxes for the emulsions used in accordance with the invention. Examples of natural waxes are carnauba and candelilla wax while examples of synthetic waxes are polyethylene and montanic ester waxes. Carnauba and candelilla wax and montanic ester waxes having dropping points of 75° to 90° C. and acid values of 15 to 40 are particularly preferred.

The waxes may be present in the emulsions used in accordance with the invention in quantities of up to 25%, based on the total weight of the emulsion. The wax content is preferably between 2 and 15% by weight and, more preferably, between 2 and 10% by weight.

The emulsions, which—in the most simple case contain no other constituents than wax, alkyl glycoside and water, are generally prepared from a preformed mixture of liquid wax and emulsifier which is either stirred into hot water or, conversely, hot water is stirred into this mixture. In both cases, the hot emulsion is subsequently cooled without vigorous stirring. In some cases, however, it can also be of advantage initially to dissolve the emulsifier in water and to distribute the molten wax in the resulting solution with vigorous stirring. Depending on the concentration of the constituents, the emulsions are liquid to paste-like and possibly thixotropic.

Although emulsions consisting only of wax, alkyl glycoside and water are preferred for the purposes of the invention, other auxiliaries may of course be added to the emulsions for special applications. Such auxiliaries are, primarily, additional emulsifiers which may emanate from any known classes, including both nonionic and anionic and cationic emulsifiers, and co-emulsifiers, for example alkalis, amines or soluble polymers. However, the percentage content of these additional emulsifiers and co-emulsifiers is generally lower than that of the alkyl glycosides. preservatives and substances for lowering the freezing point are mentioned by way of example as further auxiliaries.

In the most simple case, the cleaning and care preparations are produced by stirring the wax emulsion into the preformed mixture of the other components of the preparation. The surprisingly good compatibility of the wax emulsions based on alkyl glycosides has a particularly advantageous effect in this regard. However, it is also possible initially to introduce only part of the other constituents into water and, after mixing with the wax emulsion, subsequently to incorporate the remaining constituents of the preparation or, alternatively, to start out from the wax emulsion and to introduce the other constituents successively or more or less simultaneously into the emulsion. This particular variant is appropriate above all when the preparations contain only a few components apart from the wax emulsion. The preparations are normally produced at room temperature or slightly elevated temperature. The quantity of wax emulsion used in the production of the preparations may be selected virtually as required and is dependent on the quantity of wax which is to be present in the end product.

Furniture and paint care preparations based on the wax emulsions according to the invention contain caring oils, for example paraffin oils and/or silicone oils, and optionally preservatives, dyes, solvents, such as petrol, and antistatic agents as further constituents.

Leather-care preparations based on the wax emulsions according to the invention contain as further care constituents oils, for example silicone oils, and/or film-forming polymers, for example polyacrylates and polyurethanes, and optionally dyes, fragrance, preservatives, plasticizers, solvents and consistency regulators.

Floor cleaning and care preparations based on the wax emulsions according to the invention contain as cleaning agents surfactants, particularly from the classes of anionic and nonionic surfactants, and optionally film-forming polymers, for example polyacrylates, styrene copolymers and polyurethanes, plasticizers, water-immiscible solvents, preservatives, sequestering agents, fragrances and dyes. In the case of the cleaning preparations, the good biodegradability of the alkyl glycosides is an additional advantage.

A typical formulation of a floor-care preparation has the following composition for example:

| | |
|---|---|
| Na $C_{12/14}$ fatty alcohol sulfate | 2 to 6% by weight |
| $C_{12/14}$ fatty alcohol ethoxylate (4 EO) | 2 to 6% by weight |
| Coconut oil fatty acid monoethanolamide | 1 to 3% by weight |
| Wax emulsions (5 parts carnauba wax, 1.5 parts coconut oil glucoside (n = 1.4), 93.5 parts water) | 15 to 45% by weight |
| Preservative, fragrance, dye | less than 2% by weight |
| Water | ad 100% by weight |

EXAMPLE 1

Production of an emulsion of carnauba wax 50 kg carnauba wax, flaked form, were introduced into a heatable stirred tank and, after the addition of 35 kg of a 50% coconut oil glucoside (Plantaren ® APG 600, n=1.4), are heated to 85°–90° C. When the wax started to melt, stirring was commenced (powerful blade stirrer) to obtain a homogeneous mixture of wax and emulsifier and to prevent local foaming of the emulsifier.

After all the wax had melted, 914 kg hot water (minimum temperature 95° C.) were slowly added with vigorous stirring. After all the water had been added, the entire emulsion was immediately cooled to room temperature on a plate cooler and transferred to a separate vessel in which 1 kg glutaraldehyde was added as preservative with slow stirring.

EXAMPLE 2

Production of an emulsion of montanic ester wax 40 kg Hoechstwachs KSL (montanic ester wax—dropping point: 80°–85° C., acid value: 28–38) were introduced into a heatable stirred tank with 28 kg of a 50% coconut oil alkyl glucoside (Plantaren ® APG 600, n=1.4), and heated to 85°–90° C. As in Example 1, stirring was commenced when the wax began to melt in order to obtain a homogeneous mixture of wax and emulsifier and to prevent local foaming of the emulsifier.

After all the wax had melted, 931 kg hot water (temperature 95° C.) were slowly added with vigorous stirring. After all the water had been added, the entire emulsion was immediately cooled to room temperature on a plate cooler and transferred to a separate vessel.

EXAMPLE 3

Production of a care preparation applied by wiping 524.3 kg water at 40° C. were introduced into a mixing tank equipped with a stirrer. 15 kg coconut oil fatty acid monoethanolamide (Comperlan® 100) were added with stirring and completely dissolved. 300 kg of the wax emulsion of Example 1 were then stirred into the resulting solution. 37 kg $C_{12-14}$ fatty alcohol+4 EO (Dehydol® LS 4) and 120 kg $C_{12-14}$ fatty alcohol sulfate, 35% (Texapon® LS 35) were then added with stirring. 3 kg fragrance and 0.7 kg glutaraldehyde were then added with stirring. The liquid preparation was packed in plastic canisters.

What is claimed is:

1. A water-containing composition for the cleaning and care of furniture, paint, leather or shoes consisting essentially of at least one care oil and a wax-containing emulsion comprising from 2 to 25% by weight of wax in water and as an emulsifier an emulsifying effective quantity of at least one alkyl glycoside of the formula $$R-O(-G)_n \quad (I)$$

wherein R is a $C_{8-22}$ optionally unsaturated alkyl radical, G is a glycoside residue of a monosaccharide, and n is a number of from 1 to 10.

2. The composition of claim 1 wherein R in formula (I) is a $C_{10-18}$ alkyl radical, G is a glucose residue, and n is a number from 1 to 6.

3. The composition of claim 1 wherein said wax is selected from the group consisting of candelilla wax, carnauba wax, montanic ester wax, and mixtures thereof.

4. The composition of claim 1 wherein the amount of wax in the emulsion is from 2% to 15% by weight.

5. The composition of claim 1 wherein the amount of alkyl glycoside in said emulsion is from 0.5% to 10% by weight.

6. The composition of claim 1 wherein the composition contains from 15 to 45% by weight of said wax emulsion.

7. A wax-containing composition for the cleaning and care of furniture, paint, leather, shoes, or floors which comprises from 2% to 6% by weight of sodium $C_{12-34}$ fatty alcohol sulfate; from 2% to 6% by weight of $C_{12-14}$ fatty alcohol (4EO) ethoxylate; from 1% to 3% by weight of coconut oil fatty acid monoethanolamide; up to 2% by weight of a preservative, fragrance, or dye; and from 15% to 45% by weight of an emulsion comprising 5 parts carnauba wax, 1.5 parts of coconut oil glucoside (n=1.4), and 93.5 parts of water.

8. A process for the cleaning and care of furniture, paint, leather, shoes and floors comprising applying to said furniture, paint, leather, shoes or floors a wax-containing composition comprising an emulsion containing from 2 to 25% by weight of wax in water and as an emulsifier an emulsifying effective quantity of at least one alkyl glycoside of the formula $$R-O(-G)_n \quad (I)$$

wherein R is a $C_{8-22}$ optionally unsaturated alkyl radical, G is a glycoside residue of a monosaccharide, and n is a number of from 1 to 10.

9. The process of claim 8 wherein R in formula (I) is a $C_{10-18}$ alkyl radical, G is a glucose residue, and n is a number from 1 to 6.

10. The process of claim 8 wherein said wax is selected from the group consisting of candelilla wax, carnauba wax, montanic ester wax, and mixtures thereof.

11. The process of claim 8 wherein the amount of wax in the emulsion is from 2% to 15% by weight.

12. The process of claim 8 wherein the amount of alkyl glycoside in said emulsion is from 0.5% to 10% by weight.

13. The process of claim 8 wherein the composition contains from 15 to 45% by weight of said wax emulsion.

* * * * *